(12) United States Patent
Linden et al.

(10) Patent No.: US 8,963,769 B2
(45) Date of Patent: Feb. 24, 2015

(54) GUIDED WAVE RADAR INTERFACE MEASUREMENT MEDIUM IDENTIFICATION

(71) Applicant: Magnetrol International, Incorporated, Downers Grove, IL (US)

(72) Inventors: Michael J. Linden, Aurora, IL (US); James M. Berry, LaGrange, IL (US)

(73) Assignee: Magnetrol International, Incorporated, Aurora, IL (US)

( * ) Notice: Subject to any disclaimer, the term of this patent is extended or adjusted under 35 U.S.C. 154(b) by 144 days.

(21) Appl. No.: 13/652,637

(22) Filed: Oct. 16, 2012

(65) Prior Publication Data

US 2014/0104098 A1    Apr. 17, 2014

(51) Int. Cl.
*G01S 13/08* (2006.01)
*G01F 23/284* (2006.01)
*G01S 13/00* (2006.01)
*G01F 23/00* (2006.01)

(52) U.S. Cl.
USPC ................. 342/124; 342/21; 342/22; 342/82; 342/89; 342/118; 342/175; 342/195; 324/600; 324/629; 324/637; 324/642; 324/644; 73/290 R; 73/304 R (58) Field of Classification Search
CPC ......... G01F 23/22; G01F 23/26; G01F 23/28; G01F 23/284; G01S 13/02; G01S 13/06; G01S 13/08
USPC ............. 342/21, 22, 118, 124, 175, 192–197, 342/82, 89, 90; 324/629, 637–646, 600; 73/290 R, 304 R, 304 C, 290 V, 291, 73/292; 250/200, 216, 573, 577
See application file for complete search history.

(56) References Cited

U.S. PATENT DOCUMENTS

| | | | | | |
|---|---|---|---|---|---|
| 3,424,002 | A | * | 1/1969 | Johnson | 73/290 R |
| 3,703,829 | A | * | 11/1972 | Dougherty | 73/290 R |
| 3,812,422 | A | * | 5/1974 | De Carolis | 324/642 |
| 3,832,900 | A | * | 9/1974 | Ross | 73/290 R |
| 3,853,005 | A | * | 12/1974 | Schendel | 73/290 R |
| 3,995,212 | A | * | 11/1976 | Ross | 324/642 |
| 4,350,040 | A | * | 9/1982 | Fasching et al. | 73/304 C |
| 4,590,575 | A | * | 5/1986 | Emplit | 73/304 C |
| 4,635,478 | A | * | 1/1987 | Hope | 73/292 |
| 4,786,857 | A | * | 11/1988 | Mohr et al. | 73/304 R |

(Continued)

FOREIGN PATENT DOCUMENTS

EP    2 365 302    9/2011

*Primary Examiner* — Bernarr Gregory
(74) *Attorney, Agent, or Firm* — Wood, Phillips, Katz, Clark & Mortimer (57) ABSTRACT

A guided wave radar transmitter for interface measurement comprises a probe defining a transmission line for sensing level of two immiscible liquids to define an interface therebetween. A pulse circuit generates pulses on the transmission line and receives a reflected signal from the transmission line. The reflected signal selectively includes a level pulse representing material level and an interface pulse representing interface level. A controller operates in an interface mode to determine the material level and the interface level responsive to receiving the level pulse and the interface pulse. The controller operates in a medium identification mode responsive to not receiving the interface pulse, comprising calculating an estimated amplitude of the level pulse for the two immiscible liquids and comparing actual amplitude of the level pulse to the estimated amplitude of the level pulse to identify the medium in the vessel.

18 Claims, 7 Drawing Sheets

(56) References Cited

U.S. PATENT DOCUMENTS

| | | | |
|---|---|---|---|
| 4,847,623 A * | 7/1989 | Jean et al. | 342/124 |
| 4,924,700 A * | 5/1990 | Habart | 73/290 V |
| 5,017,909 A * | 5/1991 | Goekler | 73/304 C |
| 5,099,124 A * | 3/1992 | Benson | 250/357.1 |
| 5,164,608 A * | 11/1992 | Vali et al. | 250/577 |
| 5,327,139 A * | 7/1994 | Johnson | 342/22 |
| 5,819,582 A * | 10/1998 | Kelly | 73/290 R |
| 5,898,308 A * | 4/1999 | Champion | 324/643 |
| 6,121,780 A * | 9/2000 | Cruickshank et al. | 324/643 |
| 6,166,681 A * | 12/2000 | Meszaros et al. | 342/124 |
| 6,255,983 B1 * | 7/2001 | Meszaros et al. | 342/124 |
| 6,445,192 B1 * | 9/2002 | Lovegren et al. | 324/644 |
| 6,545,945 B2 * | 4/2003 | Caulfield | 342/22 |
| 6,701,783 B2 * | 3/2004 | Fehrenbach et al. | 73/290 V |
| 6,724,197 B2 * | 4/2004 | Neven et al. | 324/642 |
| 6,838,622 B2 * | 1/2005 | Zuch | 324/643 |
| 7,262,607 B2 * | 8/2007 | Champion et al. | 324/639 |
| 7,477,059 B2 | 1/2009 | Carobbio | |
| 7,525,476 B1 * | 4/2009 | Delin et al. | 342/124 |
| 7,532,155 B2 * | 5/2009 | Kleman et al. | 342/124 |
| 7,542,866 B1 * | 6/2009 | Lovegren et al. | 342/124 |
| 7,586,435 B1 * | 9/2009 | Edvardsson | 342/124 |
| 7,592,946 B2 * | 9/2009 | Klees et al. | 342/124 |
| 7,800,528 B2 * | 9/2010 | Nilsson et al. | 342/124 |
| 8,567,243 B2 * | 10/2013 | Malinovskiy et al. | 73/304 C |
| 2004/0036482 A1 * | 2/2004 | Sherrard | 324/644 |
| 2004/0046572 A1 * | 3/2004 | Champion et al. | 324/637 |
| 2009/0158839 A1 | 6/2009 | Spanke et al. | |

\* cited by examiner

GUIDED WAVE RADAR INTERFACE MEASUREMENT MEDIUM IDENTIFICATION

CROSS-REFERENCE TO RELATED APPLICATIONS

Not Applicable.

FEDERALLY SPONSORED RESEARCH OR DEVELOPMENT

Not Applicable.

MICROFICHE/COPYRIGHT REFERENCE

Not Applicable.

FIELD OF THE INVENTION

This invention relates to process control instruments, and more particularly, to a guided wave radar instrument with interface measurement medium identification.

BACKGROUND

Process control systems require the accurate measurement of process variables. Typically, a primary element senses the value of a process variable and a transmitter develops an output having a value that varies as a function of the process variable. For example, a level transmitter includes a primary element for sensing level and a circuit for developing an electrical signal proportional to sensed level.

Knowledge of level in industrial process tanks or vessels has long been required for safe and cost-effective operation of plants. Many technologies exist for making level measurements. These include buoyancy, capacitance, ultrasonic and microwave radar, to name a few. Recent advances in micropower impulse radar (MIR), also known as ultra-wideband (UWB) radar, in conjunction with advances in equivalent time sampling (ETS), permit development of low power and lost cost time domain reflectometry (TDR) instruments.

In a TDR instrument, a very fast pulse with a rise time of 500 picoseconds, or less, is propagated down a probe, that serves as a transmission line, in a vessel. The pulse is reflected by a discontinuity caused by a transition between two media. For level measurement, that transition is typically where the air and the material to be measured meet. These instruments are also known as guided wave radar (GWR) measurement instruments.

In addition to detecting the upper surface of a liquid, which is actually an air-liquid interface, the GWR instrument has the ability to measure the location of the interface between two immiscible liquids of differing density and dielectric properties, such as oil over water. Provided that the upper layer is sufficiently thick, and under appropriate conditions, the analog wave form will exhibit two pulses. One pulse is at the liquid surface and a second pulse is at the interface between the two liquids. However, this technique fails when the media produces only one discernible pulse. This can occur when the media consists of only one material or when the upper layer is too thin to produce a distinct pulse, i.e., the pulses from the upper surface and the interface merge into one. When this occurs in practical applications, it is important for the instrument to distinguish which material is present, such as oil or water.

Known GWR instruments approach the issue of distinguishing oil from water, given a single pulse, strictly from a signal amplitude perspective. If the signal strength of the pulse is less than a given threshold, then the pulse is assumed to be from oil. Otherwise, it is assumed to be from water. The concern with this approach is that changes in process conditions and sensitivity can affect accuracy.

The present invention is directed to solving one or more of the problems discussed above in a novel and simple manner.

SUMMARY

As described herein, a guided wave radar probe estimates amplitude of a level pulse to identify the medium in a vessel.

Broadly, there is disclosed herein a guided wave radar transmitter for interface measurement comprising a probe defining a transmission line for sensing level of two immiscible liquids to define an interface therebetween. A pulse circuit is connected to the probe for generating pulses on the transmission line and receiving a reflected signal from the transmission line. The reflected signal selectively includes a level pulse representing material level and an interface pulse representing interface level. A controller is operatively connected to the pulse circuit. The controller operates in an interface mode to determine the material level and the interface level responsive to receiving the level pulse and the interface pulse. The controller operates in a medium identification mode responsive to not receiving the interface pulse, comprising calculating an estimated amplitude of the level pulse for the two immiscible liquids and comparing actual amplitude of the level pulse to the estimated amplitude of the level pulse to identify the medium in the vessel.

The estimated amplitude of the level pulse may comprise average of expected amplitude for each of the two immiscible liquids.

It is another feature that the estimated amplitude of the level pulse may comprise the average of expected amplitude for each of the two immiscible liquids plus an offset amount.

It is a further feature that the estimated amplitude of the level pulse is periodically calculated based on measured material level.

It is yet another feature that the estimated amplitude of the level pulse is calculated based on reflection coefficient of the two immiscible liquids. The estimated amplitude of the level pulse may be calculated based on gain applied to the reflected signal and cable attenuation.

There is disclosed in accordance with another aspect a time domain reflectometry measurement instrument for interface measurement comprising a probe defining a transmission line for sensing level of two immiscible liquids to define an interface therebetween. A pulse circuit is connected to the probe for generating pulses on the transmission line and receiving a reflected signal from the transmission line. The reflected signal selectively includes a level pulse representing the material level and an interface pulse representing interface level. A signal processing circuit is connected to the pulse circuit for developing a time representation of the reflected signal. The controller is operatively connected to the pulse circuit. The controller operates in an interface mode to determine the material level and the interface level responsive to receiving the level pulse on the interface pulse. The controller operates in a medium identification mode responsive to not receiving the interface pulse, comprising calculating an estimated amplitude of the level pulse for the two immiscible liquids and comparing actual amplitude of the level pulse to the estimated amplitude of the level pulse to identify the medium in the vessel.

There is also disclosed a method of measurement medium identification comprising: providing a probe defining a transmission line for sensing level of two immiscible liquids to define an interface therebetween; generating pulses on the transmission line and receiving a reflected signal from the transmission line, the reflected signal selectively including a level pulse representing material level and an interface pulse representing interface level; and operating a programmed controller operatively connected to the pulse circuit for controlling the pulse circuit, the programmed controller operating in an interface mode to determine the material level and the interface level responsive to receiving the level pulse and the interface pulse, and operating in a medium identification mode responsive to not receiving the interface pulse, comprising calculating an estimated amplitude of the level pulse for the two immiscible liquids and comparing actual amplitude of the level pulse to the estimated amplitude of the level pulse to identify the medium in the vessel.

Other features and advantages will be apparent from a review of the entire specification, including the appended claims and drawings.

DETAILED DESCRIPTION

Figure 1:
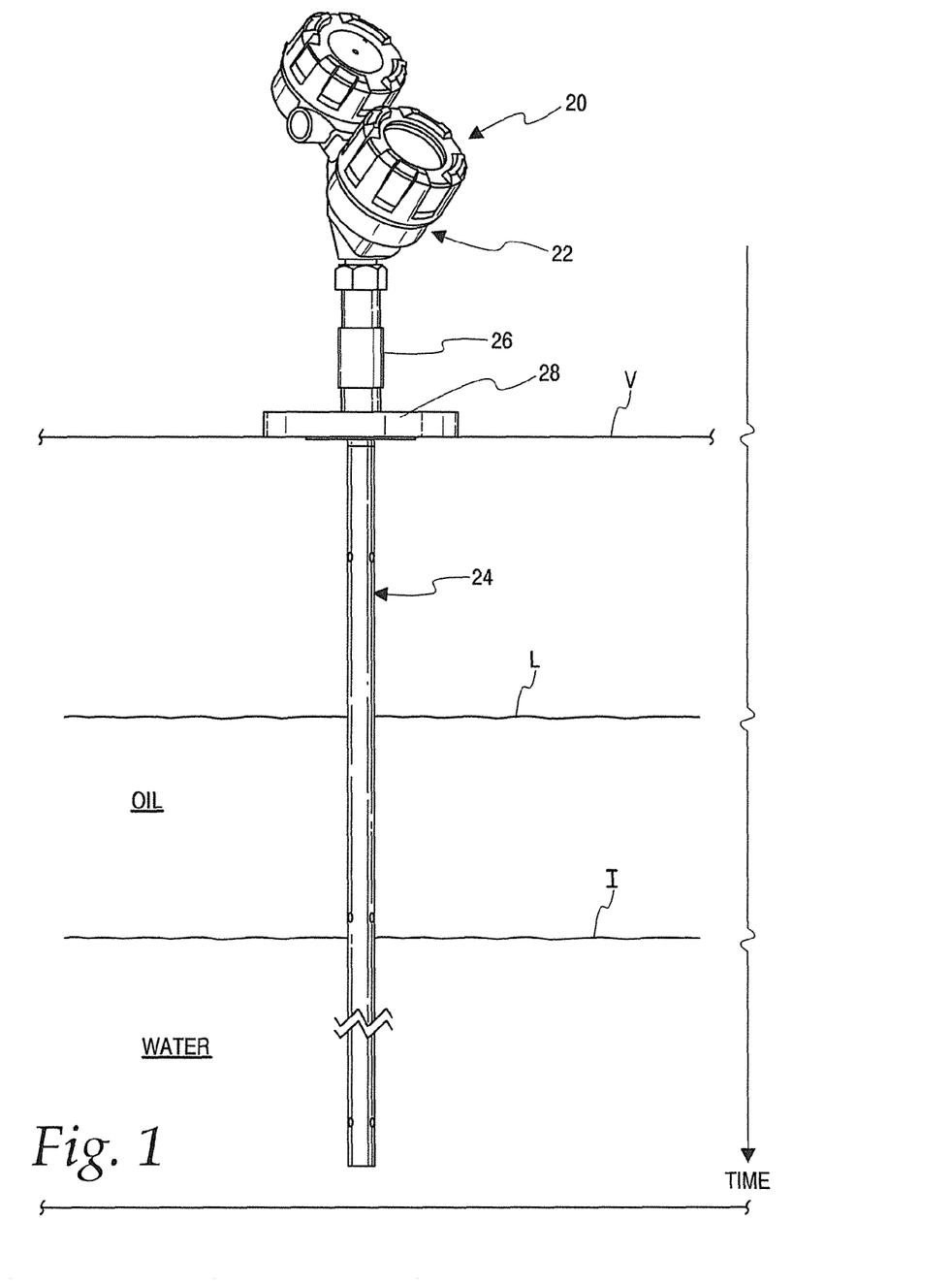
FIG. 1 is an elevation view of a guided wave radar instrument with measurement medium identification.

Referring to FIG. 1, a process instrument 20 is illustrated. The process instrument 20 uses pulsed radar in conjunction with equivalent time sampling (ETS) and ultra-wide band (UWB) transceivers for measuring level using time domain reflectometry (TDR). Particularly, the instrument 20 uses guided wave radar for sensing level. While the embodiment described herein relates to a guided wave radar level sensing apparatus, various aspects of the invention may be used with other types of process instruments for measuring various process parameters.

The process instrument 20 includes a control housing 22, a probe 24, and a connector 26 for connecting the probe 24 to the housing 22. The probe 24 is mounted to a process vessel V using a flange 28. The housing 22 is then secured to the probe 24 as by threading the connector 26 to the probe 24 and also to the housing 22. The probe 24 comprises a high frequency transmission line which, when placed in a fluid, can be used to measure level of the fluid. Particularly, the probe 24 is controlled by a controller 30, described below, in the housing 22 for determining level in the vessel V.

As described more particularly below, the controller 30 generates and transmits pulses on the probe 24. A reflected signal is developed off any impedance changes, such as the liquid surface L of the material being measured. A small amount of energy may continue down the probe 24. In addition to detecting the surface L, the instrument 20 has the ability to measure the location of an interface I between two immiscible liquids of differing density and dielectric properties, such as oil over water, as indicated. Provided the upper layer of oil is sufficiently thick, another reflected signal is developed off the interface I between the oil and water. Under normal conditions, two discernible pulses will be returned including a level pulse representing material level L and an interface pulse representing interface level I. A time based illustration of an exemplary reflected signal is illustrated to the right of FIG. 1.

Guided wave radar combines TDR, ETS and low power circuitry. TDR uses pulses of electromagnetic (EM) energy to measure distanced or levels. When a pulse reaches a dielectric discontinuity then a part of the energy is reflected. The greater the dielectric difference, the greater the amplitude of the reflection. In the measurement instrument 20, the probe 24 comprises a wave guide with a characteristic impedance in air. When part of the probe 24 is immersed in a material other than air, there is lower impedance due to the increase in the dielectric. Then the EM pulse is sent down the probe it meets the dielectric discontinuity, a reflection is generated.

ETS is used to measure the high speed, low power EM energy. The high speed EM energy (1000 foot/microsecond) is difficult to measure over short distances and at the resolution required in the process industry. ETS captures the EM signals in real time (nanoseconds) and reconstructs them in equivalent time (milliseconds), which is much easier to measure. ETS is accomplished by scanning the wave guide to collect thousands of samples. Approximately five scans are taken per second.

Figure 2:
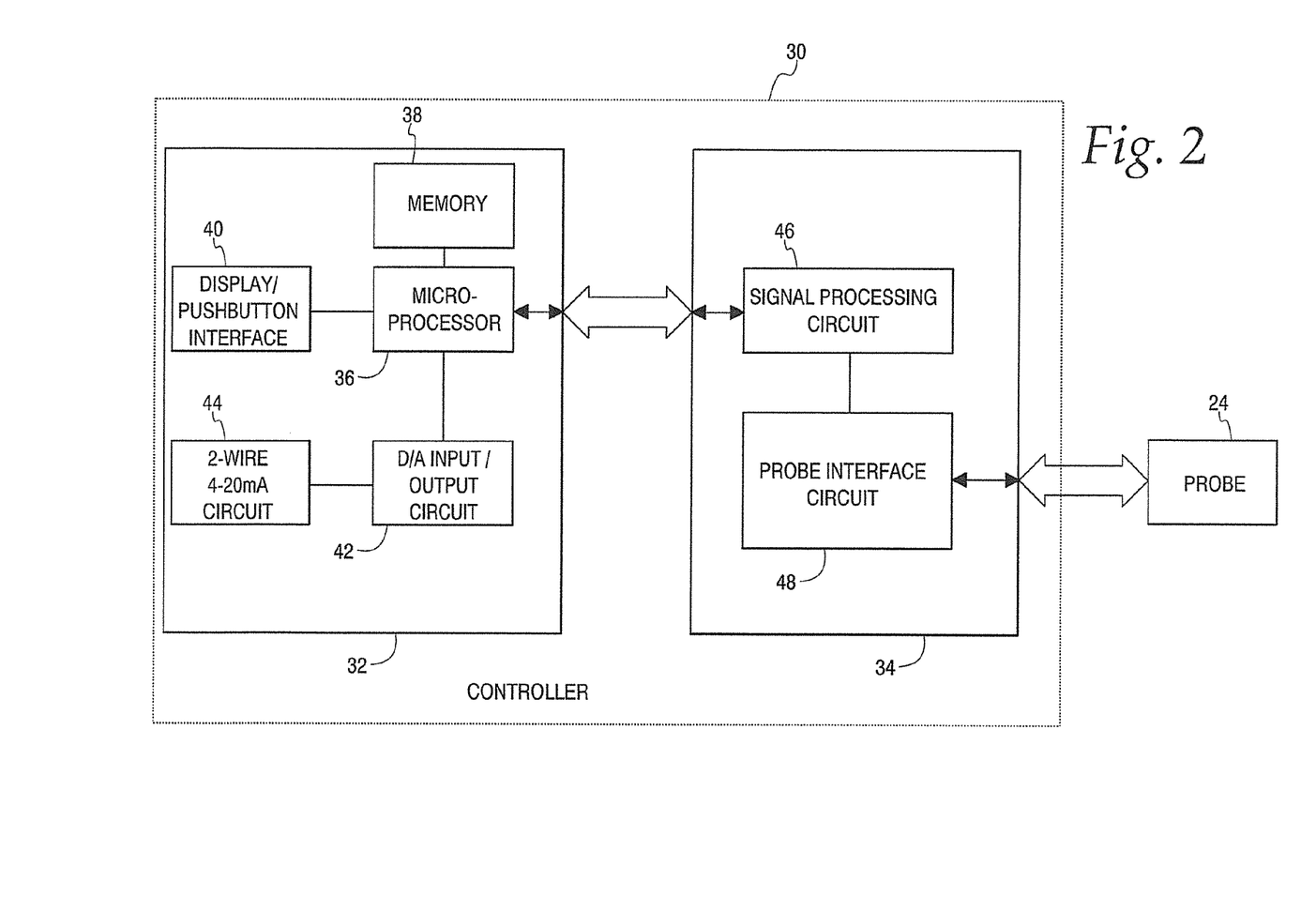
FIG. 2 is a block diagram of the instrument of FIG. 1.

Referring to FIG. 2, the electronic circuitry mounted in the housing 22 of FIG. 1 is illustrated in block diagram form as an exemplary controller 30 connected to the probe 24. As will be apparent, the probe 24 could be used with other controller designs. The controller 30 includes a digital circuit 32 and an analog circuit 34. The digital circuit 32 includes a microprocessor 36 connected to a suitable memory 38 (the combination forming a computer) and a display/push button interface 40. The display/push button interface 40 is used for entering parameters with a keypad and displaying user and status information. The memory 38 comprises both non-volatile memory for storing programs and calibration parameters, as well as volatile memory used during level measurement. The microprocessor 36 is also connected to a digital to analog input/output circuit 42 which is in turn connected to a two-wire circuit 44 for connecting to a remote power source. Particularly, the two-wire circuit 44 utilizes loop control and power circuitry which is well known and commonly used in process instrumentation. The two-wire circuit 44 controls the current on the two-wire line in the range of 4-20 mA which represents level or other characteristics measured by the probe 24.

The microprocessor 36 is also connected to a signal processing circuit 46 of the analog circuit 34. The signal processing circuit 46 is in turn connected via a probe interface circuit 48 to the probe 24. The probe interface circuit 48 includes an ETS circuit which converts real time signals to equivalent time signals, as discussed above. The signal processing circuit 44 processes the ETS signals and provides a timed output to the microprocessor 36, as described more particularly below.

The general concept implemented by the ETS circuit is known. The probe interface circuit 48 generates hundreds of thousands of very fast pulses of 500 picoseconds or less rise time every second. The timing between pulses is tightly controlled. The reflected pulses are sampled at controlled intervals. The samples build a time multiplied "picture" of the reflected pulses. Since these pulses travel on the probe 24 at the speed of light, this picture represents approximately ten nanoseconds in real time for a five-foot probe. The probe interface circuit 48 converts the time to about seventy-one milliseconds. As is apparent, the exact time would depend on various factors, such as, for example, probe length. The largest signals have an amplitude on the order of twenty millivolts before amplification to the desired amplitude by common audio amplifiers. For a low power device, a threshold scheme is employed to give interrupts to the microprocessor 36 for select signals, namely, fiducial, target, level, and end of probe, as described below. The microprocessor 36 converts these timed interrupts into distance. With the probe length entered through the display/push button interface 40, or some other interface, the microprocessor 36 can calculate the level by subtracting from the probe length the difference between the fiducial and level distances. Changes in measured location of the reference target can be used for velocity compensation, as necessary or desired.

Figure 3:
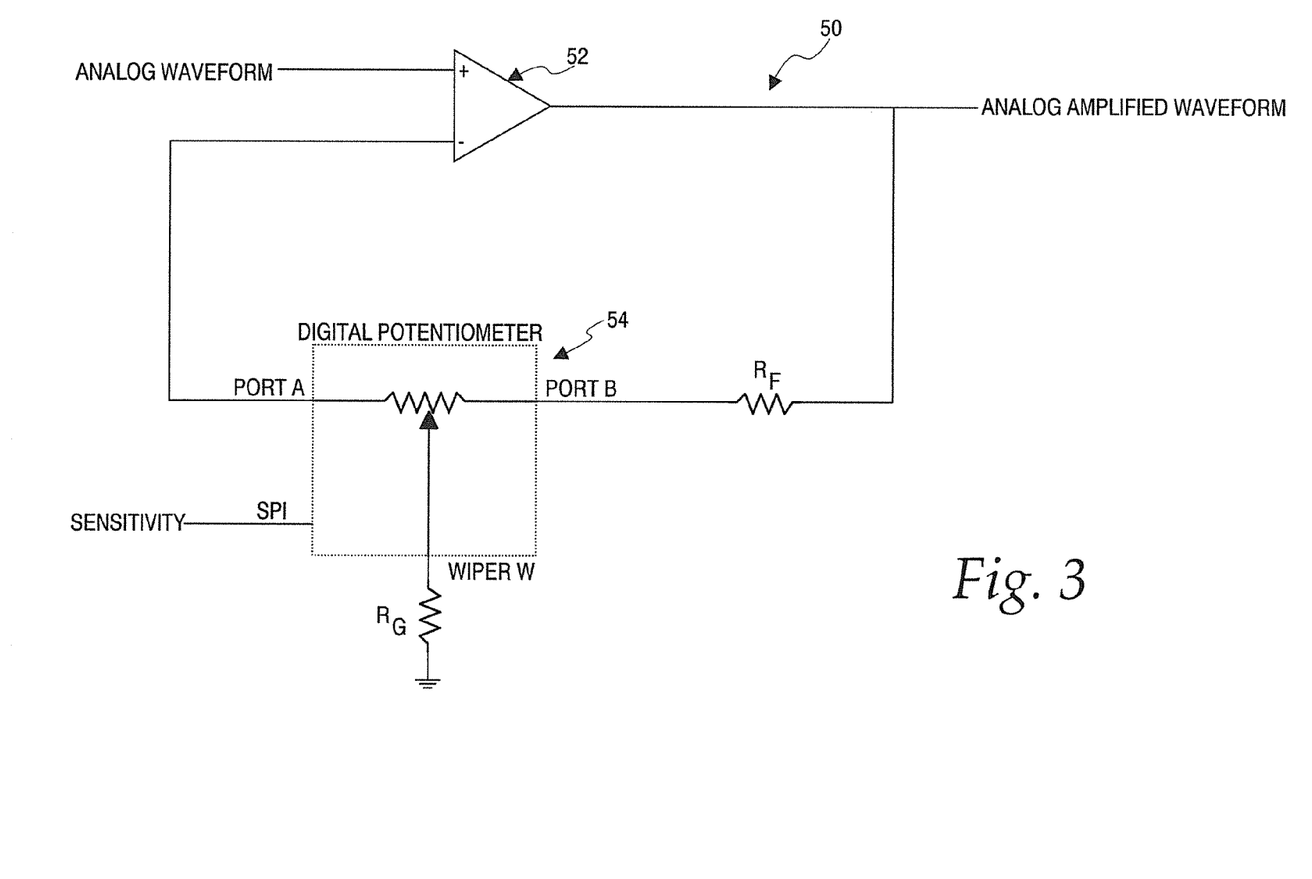
FIG. 3 is a schematic of a sensitivity adjustment circuit of the instrument of FIG. 1.

When the controller 30 is configured for interface operation, i.e., to calculate an interface level I, see FIG. 1, the software implemented by the microprocessor 36 calculates an optimal sensitivity value. The sensitivity value is based on the probe model, the dielectric value of the upper liquid, and the HF cable gain ratio of any cable between the probe interface circuit 48 and the probe 24. FIG. 3 illustrates a sensitivity control circuit 50. An analog wave form received by the probe interface circuit from the probe 24 is input to the non-inverted input of an amplifier 52. An output is an analog amplified wave form passed on to the signal processing circuit 46. A digital potentiometer 54 is connected in the feedback circuit between the output and the inverted input of the amplifier 52. The digital potentiometer 54 includes a port A connected to the inverted input of the amplifier 52 and a port B connected via a resistor $R_F$ to the output of the amplifier 52. The wiper input of the potentiometer 54 is connected via resistor $R_G$ to a ground. The SPI input, which controls wiper position and thus resistance, receives a SENSITIVITY value from the microprocessor 36. As such, the microprocessor under the control of the program, writes the sensitivity value to the digital potentiometer 54 to control the gain of the receiver on every interface scan.

Figure 4:
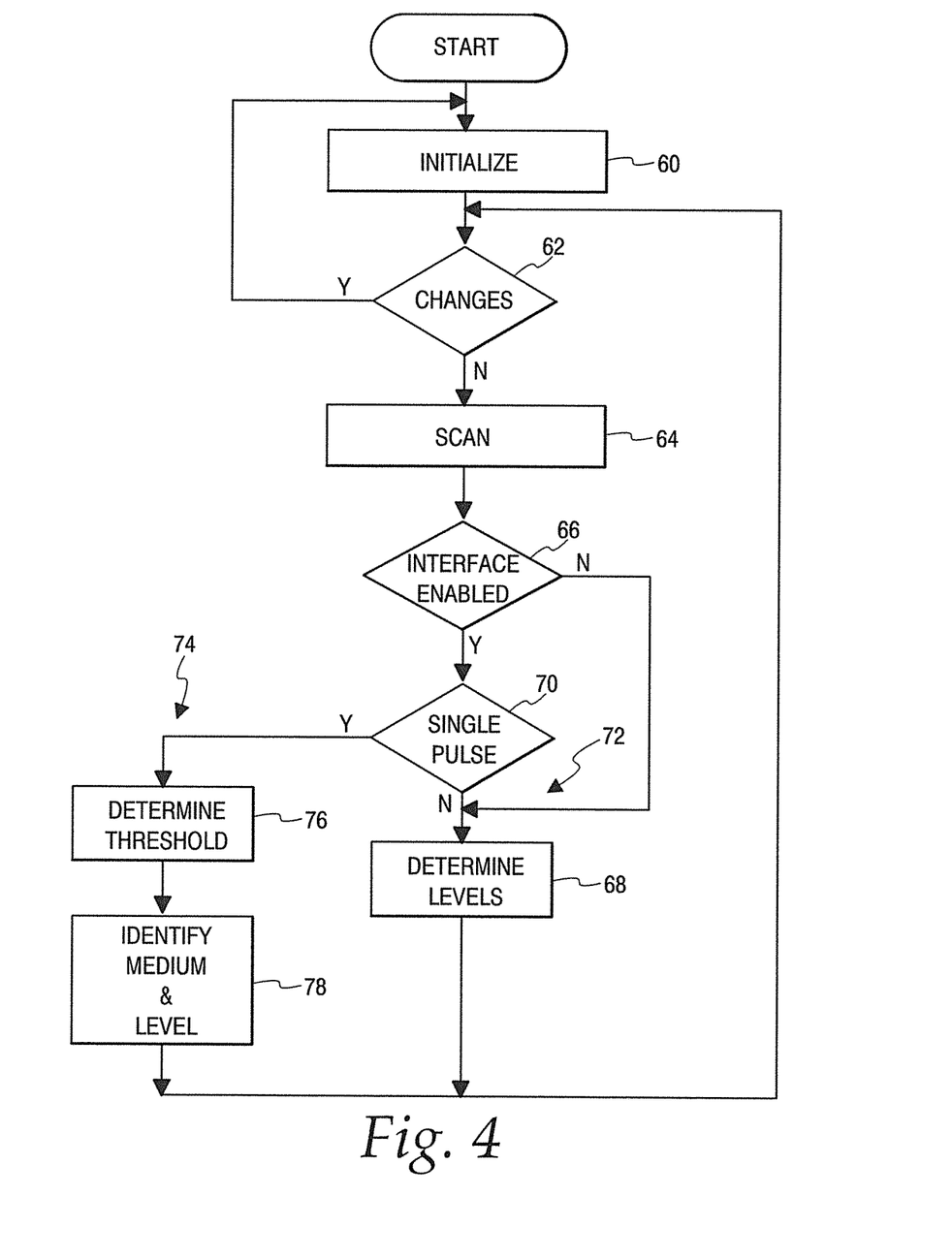
FIG. 4 is a flow diagram illustrating a measurement routine implemented in the microprocessor of FIG. 2.

Referring to FIG. 4, a flow diagram illustrates a measurement routine implemented in the microprocessor 36 for measuring liquid level L and interface level I. This routine begins at a block 60 which performs an initialization routine to initialize various parameters, as described below. A decision block 62 determines if any changes have been made in the configuration, using the display/push button interface 40, see FIG. 2. If so, then the program returns to the initialization block 60. If not, then a measurement scan routine is implemented at a block 64. A decision block 66 determines if interface measurement is enabled. If not, then the program advances to a block 68 to determine the liquid level L, see FIG. 1, in a normal manner. The program then returns to the block 62.

If interface measurement is enabled, as determined at the decision block 66, then a decision block 70 determines if only a single pulse was returned. This would occur, for example, when the media consists of only one material or when the upper layer is too thin to produce a distinct pulse such that the pulses merge into one. This single pulse would be considered the level pulse as it is the first pulse received and thus infers that an interface pulse has not been detected. If both pulses are received, then the material level L and interface level I are determined in the normal manner at the block 68. This comprises an interface mode 72 which determines the material level L and the interface level I responsive to receiving the respective level pulse and the interface pulse, as illustrated in FIG. 1. Otherwise, if only a single pulse is received, then the program operates in a medium identification mode 74 to identify the medium in the vessel. The medium identification mode begins at a block 76 which calculates estimated amplitude of the level pulse for the two immiscible liquids to thus determine a threshold. The estimated amplitude is advantageously average amplitude of the level pulse of the two immiscible liquids. A block 78 compares the actual amplitude of the level pulse to the estimated amplitude of the level pulse to identify the medium in the vessel. The actual material level L is also determined. The program then returns to the block 62.

The following discussion assumes that the media at issue consists of a layer of oil over a layer of water, as shown in FIG. 1. As will be apparent, other types of liquids could also be used.

The measurement program calculates estimated amplitudes of return pulses for both oil and water. An oil signal threshold is then calculated as the average of the two estimated amplitudes. This insures that the oil signal threshold used is centered between the two estimated amplitudes. This maximizes the margin for error equally in both directions. Also, a boundary offset may be added to the lossy oil signal threshold, to be offset up or down, to account for situations in which the amplitude estimate calculations do not accurately reflect the amplitudes of the signals due to process conditions, probe variations, etc. The boundary offset value is added to the oil signal threshold after it has been calculated.

The estimated amplitudes are calculated using the following equations.

$$ES_{coax} = C_1 \Gamma G$$

$$ES_{TR} = C_1 \Gamma G e^{C_2 z}$$

$$\Gamma = \frac{\sqrt{\varepsilon} - 1}{\sqrt{\varepsilon} + 1}$$

$$G = \frac{2 + \left(\frac{50}{256}\right) \cdot \text{Sensitivity}}{R}$$

$$R = [1.00, 1.09, 1.45]$$

Where $ES_{coax}$ (in Echo Strength units) is the Echo Strength of the signal reflected from an impedance discontinuity for coax and coax-like (single rod in chamber) probes and $ES_{TR}$ is the equivalent equation for an exemplary flexible twin rod probe. Typical constant values are $C_1$=36.2 for a coaxial probe and $C_1$=19.152 and $C_2$=−0.0173 for a twin rod probe (TR). In the case of $ES_{TR}$, z is the distance to the signal from the probe reference in feet. The TR equation includes a distance factor as the probe is lossy which causes signals to weaken significantly with distance. $\Gamma$ is the reflection coefficient of the medium whose amplitude is being calculated (oil, water, etc.), and G is the gain. Gain is normalized for the attenuation of the 3 and 12 foot extension cables by the inclusion of R which is the HF Cable gain ratio. The values shown are for the integral, 3 foot, and 12 foot HF cables, accordingly.

As indicated above, the two Echo Strength equations are for different probes. Only one of the two equations is used for a given instrument. Whichever equation is used, the estimate calculation is performed twice, with different reflection coefficients for the two relevant liquids. The reflection coefficient calculation for water is always performed using a dielectric ($\in$) value of 40. A value of 40 is used to be conservative as a thin layer of oil over water tends to reduce the water signal amplitude. The reflection coefficient calculation for oil is performed using the dielectric (∈) value that is defined by the upper dielectric parameter. The expected amplitude of a signal on a probe can be expected to change when the sensitivity or gain changes, the cable changes or the upper dielectric changes. Therefore, the calculated estimated amplitude is a function of these configuration parameters. If the configuration is changed, then the estimated amplitude will change. With the twin rod probe, the signal distance is also used in the amplitude calculations. As such, the estimated amplitude is recalculated after every measurement scan with a twin rod probe in the event that the signal distance has changed.

Figure 5:
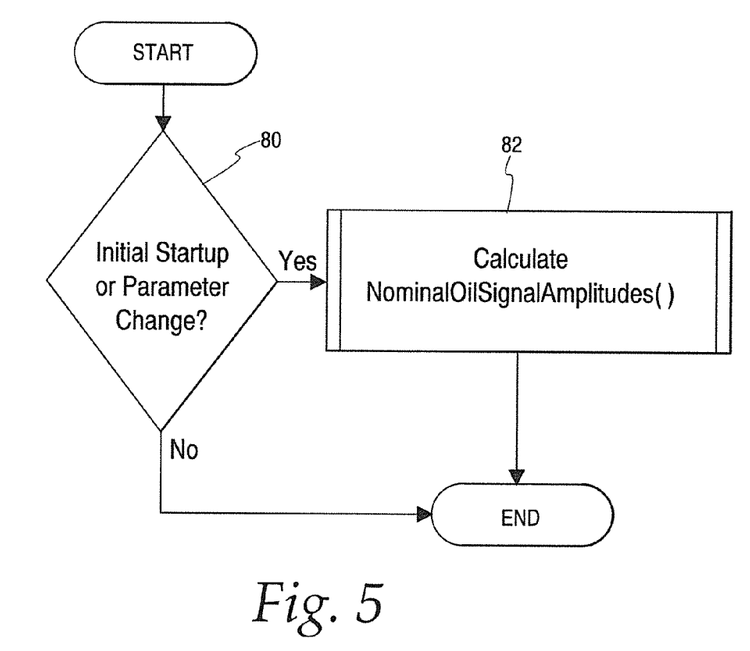
FIG. 5 is a flow diagram of a routine for a primary measured values task.

Referring to FIG. 5, a flow diagram illustrates a primary measured values task implemented in the initialize block 60 of FIG. 4. This calculates a non-distance compensated portion of predicted oil and water signal amplitudes. A decision block 80 determines if the initial start-up is being performed or if a configuration parameter has changed. If not, then the routine ends. If so, then at a block 82 the predicted oil and water signal amplitudes [NominalOilSignalAmpl_esu] and [NominalWaterSignalAmpl_esu] are calculated. These are calculated using the equations above. The routine then ends.

Figure 6:
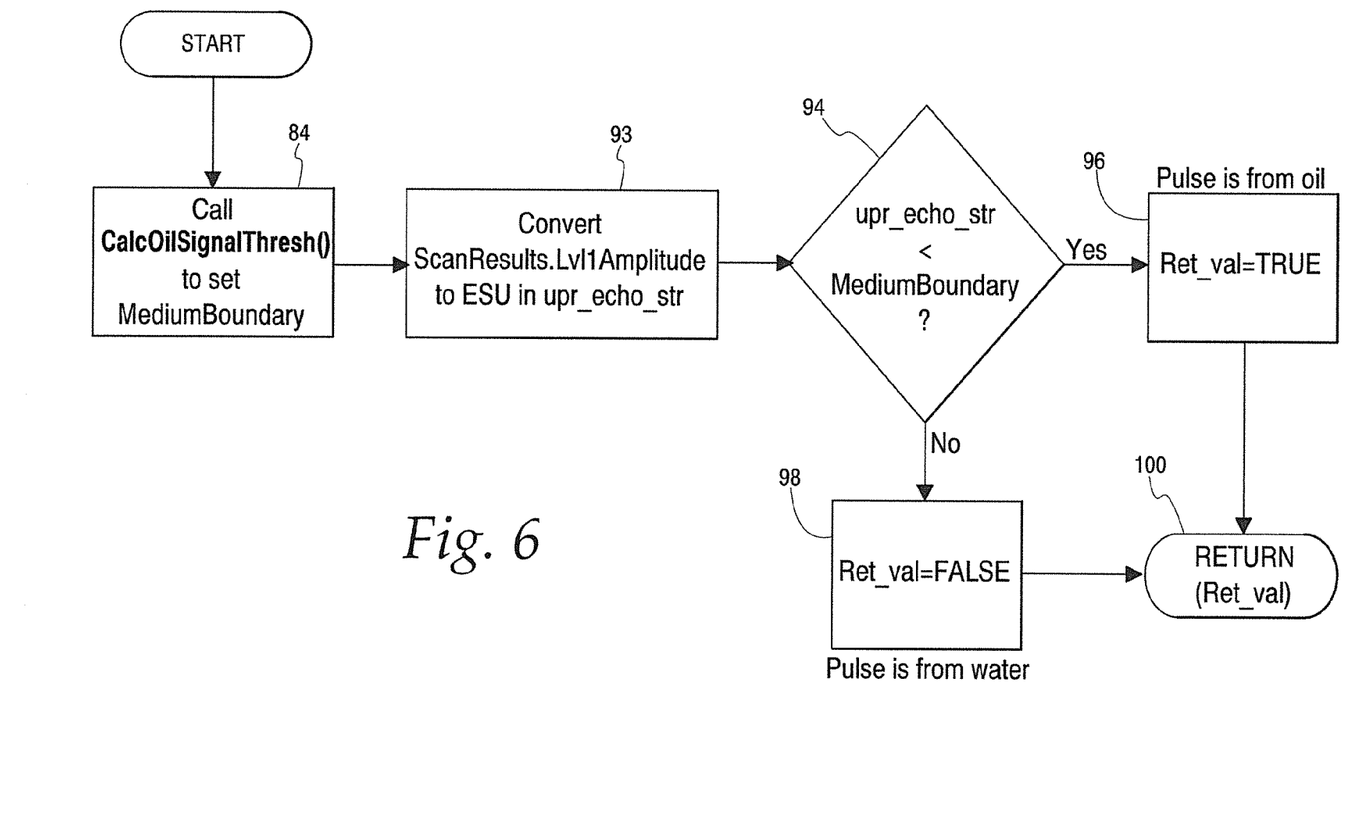
FIG. 6 is a flow diagram of a routine for medium identification.
Figure 7:
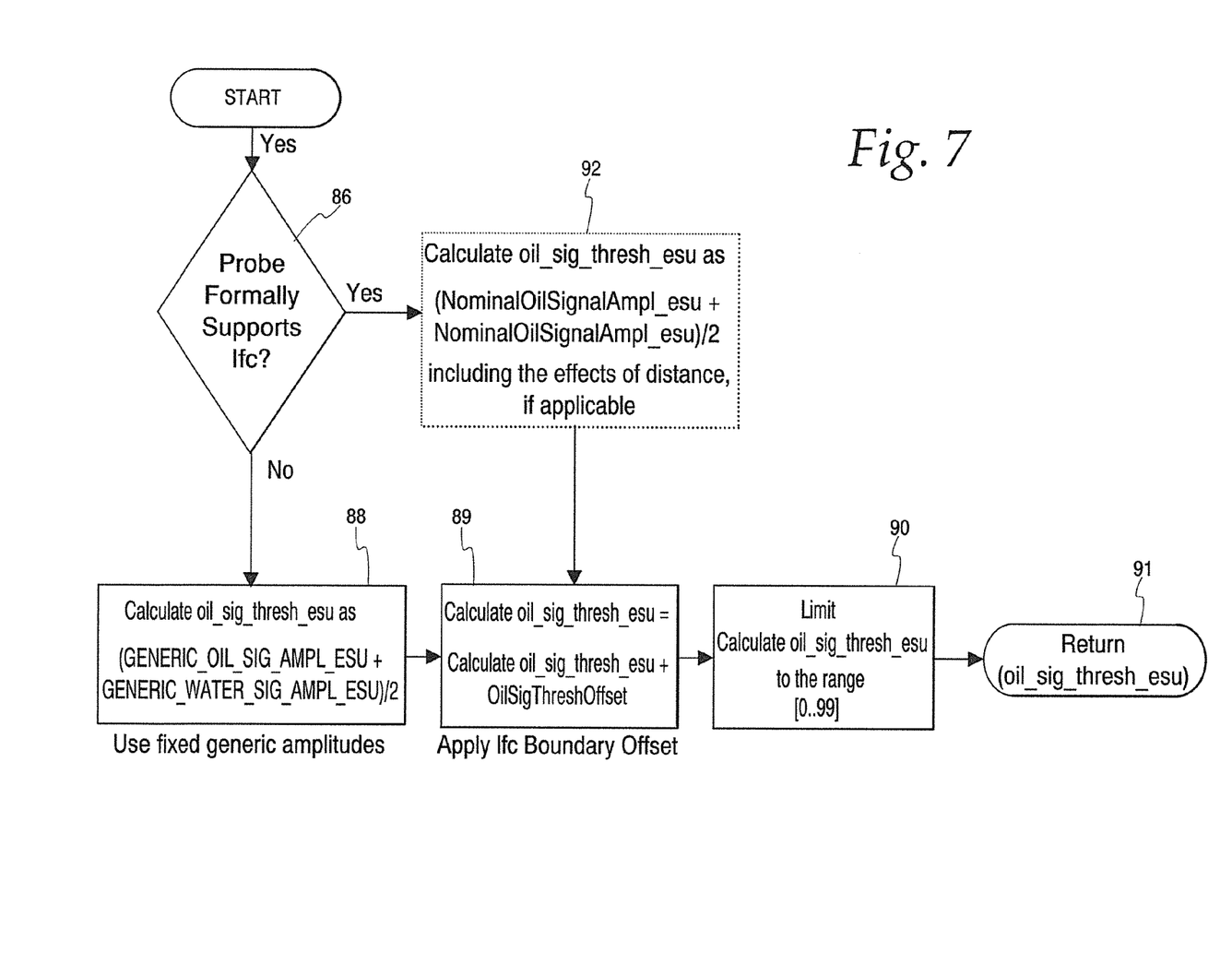
FIG. 7 is a flow diagram of a threshold adjustment routine implemented by the routine of FIG. 6.

The flow diagram of FIG. 6 illustrates the medium identification mode 74, see FIG. 4, in greater detail. This begins at a block 84 which calls a CalcOilSignalThresh routine to set an interface Medium Boundary value. This routine is illustrated in FIG. 7. In FIG. 7, a decision block 86 determines if the probe formally supports interface operation (Ifc) for the configured probe. If not, then an oil_sig_thresh_esu value is set using fixed generic amplitudes which may produce a default value of, for example, 75 echo strength units. An Ifc boundary offset value is added at a block 89. A block 90 then applies a limit to the calculated value and this value is returned at a block 91. If interface operation is enabled, then a block 92 calculates the oil_sig_thresh_esu value based on the Nominal_Oil_SignalAmp_esu value from the block 82. This includes the effects of distance, if applicable. The oil_sig_thresh_esu value is then provided to the block 89, discussed above.

Returning to FIG. 6, a block 93 converts the scan result actual level amplitude of the returned level pulse to an Echo Strength unit value identified as upr_echo_str. This provides the same units as used with the threshold. A decision block 94 determines if the converted value upr_echo_str is less than the Medium Boundary value returned from the block 90. If so, then the single received pulse is from oil, as indicated at a block 96 and the return value is true. If not, then the single received pulse is from water, as indicated at the block 98 and a return value is set to false. The return value is then used at a block 100 to provide an indication of the medium.

The use of amplitude, as discussed, to determine the nature of a single pulse requires that the oil signal's amplitude not saturate. If the oil signal saturates, it cannot be distinguished from water using an amplitude comparison. With the use of a flexible twin rod probe lower-dielectric signals may saturate near the top two feet, or so, of the probe using the Sensitivity values discussed above. The three Sensitivity dielectric ranges may not have enough resolution to provide Sensitivities that would prevent oil signal saturation near the top of the probe while providing an adequate oil signal 60 feet down the probe.

It is possible to calculate an optimal Sensitivity for the flexible twin rod probe based on Upper Dielectric and HF Cable selection. The goal of the calculation is to provide a Sensitivity setting that is as large as possible without resulting in saturation near the top of the twin-flex probe. An auto-config equation is as follows:

$$\text{Sensitivity} = C_1 \cdot R \cdot \frac{\sqrt{\varepsilon}+1}{\sqrt{\varepsilon}-1} - 10.24$$

Where

R=[1.00,1.09,1.45]

for the integral, 3-foot, and 12-foot HF Cables, accordingly, and ∈ is the Upper Dielectric. $C_1$ is 7.38 for a coaxial probe and 21.56 for a twin rod (TR) probe. This feature will be implemented by modifying the Parameter Database such that the Sensitivity is auto-configured via this equation when the system is configured for interface operation. This sensitivity value is used to control gain, as discussed above relative to FIG. 3. As noted, sensitivity is also calculated for a coaxial probe. Only the leading constant differs. This is done because interface measurement appears optimal if the oil pulse has an amplitude of about 50 units.

Thus, as described, an improved guided wave radar probe, which is used for industrial process level measurement, employs an analytical model that predicts the amplitude of the reflected pulses given the operating conditions of the instrument, the dielectric constants of the media and the distance of the upper surface. When the instrument that measures an interface detects only a single pulse, the amplitude of that pulse is compared to predicted amplitude that is an average of each material to identify the medium according to which one is most likely to have produced that pulse. Moreover, the operating gain of the instrument is adjusted based on the dielectric constant of the upper medium to produce a measurable pulse based on the analytical model. This permits the instrument to operate at a higher gain to detect the upper layer at longer distance or lower dielectric constants, even though the reflection from the lower layer may be saturated.

It will be appreciated by those skilled in the art that there are many possible modifications to be made to the specific forms of the features and components of the disclosed embodiments while keeping within the spirit of the concepts disclosed herein. Accordingly, no limitations to the specific forms of the embodiments disclosed herein should be read into the claims unless expressly recited in the claims. Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A guided wave radar transmitter for interface measurement comprising:
a probe defining a transmission line for sensing level of two immiscible liquids to define an interface therebetween;
a pulse circuit connected to the probe for generating pulses on the transmission line and receiving a reflected signal from the transmission line, the reflected signal selectively including a level pulse representing material level and an interface pulse representing interface level; and
a controller operatively connected to the pulse circuit, the controller operating in an interface mode to determine the material level and the interface level responsive to receiving the level pulse and the interface pulse, and operating in a medium identification mode responsive to not receiving the interface pulse, comprising calculating an estimated amplitude of the level pulse for the two immiscible liquids and comparing actual amplitude of the level pulse to the estimated amplitude of the level pulse to identify the medium in the vessel.

2. The guided wave radar transmitter of claim 1 wherein the estimated amplitude of the level pulse comprises average of expected amplitude for each of the two immiscible liquids.

3. The guided wave radar transmitter of claim 1 wherein the estimated amplitude of the level pulse comprises average of expected amplitude for each of the two immiscible liquids plus an offset amount.

4. The guided wave radar transmitter of claim 1 wherein the estimated amplitude of the level pulse is periodically calculated based on measured material level.

5. The guided wave radar transmitter of claim 1 wherein the estimated amplitude of the level pulse is calculated based on reflection coefficient of the two immiscible liquids.

6. The guided wave radar transmitter of claim 5 wherein the estimated amplitude of the level pulse is calculated based on gain applied to the reflected signal and cable attenuation.

7. A time domain reflectometry measurement instrument for interface measurement comprising:
   a probe defining a transmission line for sensing level of two immiscible liquids to define an interface therebetween;
   a pulse circuit connected to the probe for generating pulses on the transmission line and receiving a reflected signal from the transmission line, the reflected signal selectively including a level pulse representing material level and an interface pulse representing interface level;
   a signal processing circuit connected to the pulse circuit for developing a time representation of the reflected signal; and
   a controller operatively connected to the pulse circuit, the controller operating in an interface mode to determine the material level and the interface level responsive to receiving the level pulse and the interface pulse, and operating in a medium identification mode responsive to not receiving the interface pulse, comprising calculating an estimated amplitude of the level pulse for the two immiscible liquids and comparing actual amplitude of the level pulse to the estimated amplitude of the level pulse to identify the medium in the vessel.

8. The time domain reflectometry measurement instrument of claim 7 wherein the estimated amplitude of the level pulse comprises average of expected amplitude for each of the two immiscible liquids.

9. The time domain reflectometry measurement instrument of claim 7 wherein the estimated amplitude of the level pulse comprises average of expected amplitude for each of the two immiscible liquids plus an offset amount.

10. The time domain reflectometry measurement instrument of claim 7 wherein the estimated amplitude of the level pulse is periodically calculated based on measured material level.

11. The time domain reflectometry measurement instrument of claim 7 wherein the estimated amplitude of the level pulse is calculated based on reflection coefficient of the two immiscible liquids.

12. The time domain reflectometry measurement instrument of claim 11 wherein the estimated amplitude of the level pulse is calculated based on gain applied to the reflected signal and cable attenuation.

13. A method of measurement medium identification comprising:
   providing a probe defining a transmission line for sensing level of two immiscible liquids to define an interface therebetween;
   generating pulses on the transmission line and receiving a reflected signal from the transmission line, the reflected signal selectively including a level pulse representing material level and an interface pulse representing interface level; and
   operating a programmed controller operatively connected to the pulse circuit for controlling the pulse circuit, the programmed controller operating in an interface mode to determine the material level and the interface level responsive to receiving the level pulse and the interface pulse, and operating in a medium identification mode responsive to not receiving the interface pulse, comprising calculating an estimated amplitude of the level pulse for the two immiscible liquids and comparing actual amplitude of the level pulse to the estimated amplitude of the level pulse to identify the medium in the vessel.

14. The method of claim 13 wherein the estimated amplitude of the level pulse comprises average of expected amplitude for each of the two immiscible liquids.

15. The method of claim 13 wherein the estimated amplitude of the level pulse comprises average of expected amplitude for each of the two immiscible liquids plus an offset amount.

16. The method of claim 13 wherein the estimated amplitude of the level pulse is periodically calculated based on measured material level.

17. The method of claim 13 wherein the estimated amplitude of the level pulse is calculated based on reflection coefficient of the two immiscible liquids.

18. The method of claim 17 wherein the estimated amplitude of the level pulse is calculated based on gain applied to the reflected signal and cable attenuation.

* * * * *